United States Patent
Doong et al.

(10) Patent No.: US 8,500,884 B2
(45) Date of Patent: Aug. 6, 2013

(54) VESSEL AND PROCESS PERTAINING TO AN IMPERMEABLE IMPINGEMENT PLATE

(75) Inventors: Shain-Jer Doong, Kildeer, IL (US); Hadjira Iddir, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 299 days.

(21) Appl. No.: 12/891,725

(22) Filed: Sep. 27, 2010

(65) Prior Publication Data
US 2012/0073437 A1    Mar. 29, 2012

(51) Int. Cl.
*B01D 53/02* (2006.01)

(52) U.S. Cl.
USPC .......................... 96/139; 137/561 A; 137/590

(58) Field of Classification Search
USPC ................. 96/139; 137/561 A, 590
See application file for complete search history.

(56) References Cited

U.S. PATENT DOCUMENTS

| | | | | |
|---|---|---|---|---|
| 2,777,533 A * | 1/1957 | Segrest | ............................. | 96/189 |
| 2,843,534 A * | 7/1958 | Harper | ............................. | 203/88 |
| 3,873,283 A * | 3/1975 | Hamblin | ............................. | 96/189 |
| 4,338,106 A * | 7/1982 | Mizuno et al. | ............................. | 96/139 |
| 4,350,504 A * | 9/1982 | Diachuk | ............................. | 422/105 |
| 4,364,753 A * | 12/1982 | Wagner | ............................. | 96/130 |
| 4,486,203 A * | 12/1984 | Rooker | ............................. | 96/206 |
| 5,038,815 A * | 8/1991 | Palmer | ............................. | 137/237 |
| 5,160,355 A | 11/1992 | Toppel | | |
| 5,190,105 A * | 3/1993 | D'Souza | ............................. | 166/303 |
| 5,514,205 A * | 5/1996 | Awaji | ............................. | 96/152 |
| 5,538,543 A * | 7/1996 | Watanabe et al. | ............................. | 96/131 |
| 5,538,544 A | 7/1996 | Nowobilski et al. | | |
| 5,672,196 A * | 9/1997 | Acharya et al. | ............................. | 95/97 |
| 5,769,928 A | 6/1998 | Leavitt | | |
| 5,779,773 A | 7/1998 | Cam et al. | | |
| 5,814,129 A * | 9/1998 | Tentarelli | ............................. | 95/90 |
| 5,882,385 A * | 3/1999 | Bosquain et al. | ............................. | 96/138 |
| 5,964,259 A * | 10/1999 | Ackley et al. | ............................. | 141/286 |
| 6,334,889 B1 | 1/2002 | Smolarek et al. | | |
| 6,605,135 B2 | 8/2003 | Lee et al. | | |
| 6,770,120 B2 * | 8/2004 | Neu et al. | ............................. | 95/96 |
| 6,884,358 B1 * | 4/2005 | Falkner | ............................. | 210/721 |
| 6,966,936 B2 * | 11/2005 | Yamasaki et al. | ............................. | 55/385.2 |
| 7,166,151 B2 | 1/2007 | Baksh et al. | | |
| 7,264,651 B2 | 9/2007 | Henzler et al. | | |
| 7,393,394 B2 | 7/2008 | Nowobilski et al. | | |
| 7,491,259 B2 | 2/2009 | Buchelli et al. | | |
| 2005/0000572 A1 * | 1/2005 | Muller | ............................. | 137/561 A |
| 2007/0095212 A1 | 5/2007 | Nowobilski et al. | | |
| 2009/0314159 A1 * | 12/2009 | Haggerty | ............................. | 95/90 |

FOREIGN PATENT DOCUMENTS

| | | |
|---|---|---|
| EP | 0080125 A1 | 11/1982 |
| WO | 2004113788 A1 | 12/2004 |

* cited by examiner

*Primary Examiner* — Christopher P Jones
(74) *Attorney, Agent, or Firm* — Mark Goldberg

(57) ABSTRACT

One exemplary embodiment can be a vessel. The vessel can include a body, an inlet, and an impermeable impingement plate. The body may include a substantially cylindrical structure orientated substantially horizontally, and first and second heads coupled at opposing ends of the substantially cylindrical structure. Generally, the body forms an interior space, and a lower portion of the body forms a trough having a length and a width. The inlet can communicate with the interior space of the vessel. Typically, the impermeable impingement plate has an impingement surface. The impermeable impingement plate may have a first side and a second side extending substantially the length of the trough. The first and second sides may be substantially parallel and spaced apart across at least a portion of the width of the trough.

19 Claims, 4 Drawing Sheets

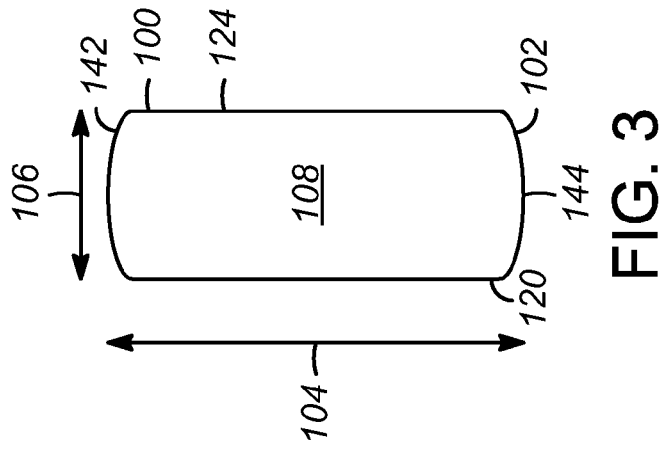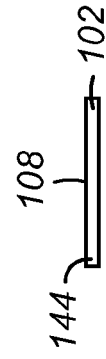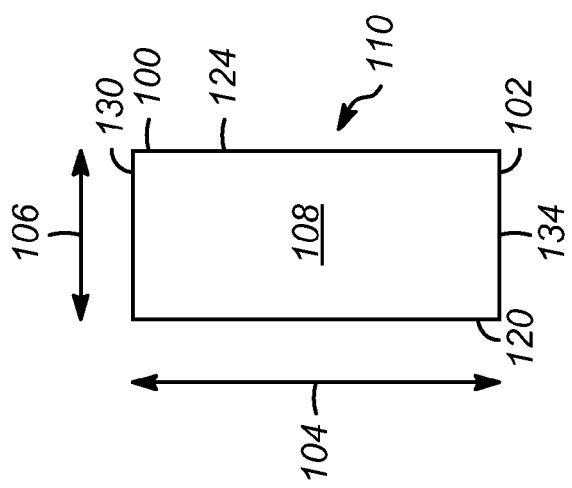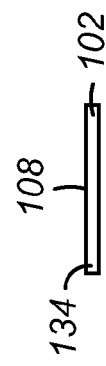
FIG. 3
FIG. 4
FIG. 1
FIG. 2

VESSEL AND PROCESS PERTAINING TO AN IMPERMEABLE IMPINGEMENT PLATE

FIELD OF THE INVENTION

This invention generally relates to a vessel and process using an impermeable impingement plate.

DESCRIPTION OF THE RELATED ART

In adsorption processes, solid adsorbents are typically contained within an adsorber in a fixed bed arrangement. Typically, the packed adsorbents are supported by a grid or other similar support system. Nozzles at the top and bottom of the vessel can be used to direct gas flow from piping into and out of the adsorber. In some instances, the flow can be reversed through the adsorber depending on its mode of operation, e.g., adsorption or regeneration. Often, the adsorber has a much larger diameter than the gas piping.

To improve fluid flow, a circular tray, often corresponding in shape with the nozzle piping, can be installed above the nozzle at the bottom to slow down the incoming gas jet velocity and divert the gas into an empty chamber just below the aforementioned support grid. Similarly, at the top of the vessel, a circular tray may be installed below a top nozzle with an empty space above the surface of the packed adsorbent. The vessel heads, such as those that are dished-shaped, can account for most of the empty space. Thus, the gas entering the vessel is first dispersed or circulated in the empty chamber, allowing the gas to enter the packed adsorbent section in a more uniform manner.

Often, the use of a support grid in an adsorber can cause problems. The support grid may fail or leak, allowing the adsorbents to pass through. Repairing a failed support grid can be costly, generally requiring the emptying of the entire adsorber. The relatively large empty space below the support grid can increase the total void of the adsorption system, which may contribute to a poor performance of gas separation, particularly in pressure swing adsorption (which may be abbreviated "PSA") processes. Additionally, the metallic support grid may add a significant amount of inert mass to the adsorber. During a heat regeneration step of a temperature swing adsorption (which may be abbreviated "TSA") process, the metallic support grid may contribute to an increase of heating duty.

Generally, the height and diameter are limited in the adsorber due to pressure drop constraints, flow distributions, and logistic issues such as fabrication and transportation. Typically, one alternative approach to process very high flow rates is to use a horizontal bed, where the adsorbents are packed and supported in a cylindrical vessel with its longitudinal axis parallel to the ground. Generally, the gas enters and exits the vessel through the nozzles located in the shell section of the vessel. The use of a horizontal bed can reduce the gas traveling distance or the packed sorbent height, thus reducing the pressure drop. However, the vessel length or flow area may need to be increased to contain a given amount of the sorbent volume. As a result, the support grid typically also becomes larger than a typical vertical bed, exasperating the issues mentioned above. Moreover, as the support grid is often attached to the wall of the vessel shell, the design and installation of the support grid can become more challenging due to the curvature of the vessel surface.

One possible solution for the drawbacks of a support grid is omitting the support grid and filling the bottom empty space with inert balls, such as ceramic or alumina balls. The active adsorbents are then supported by the inert balls. Generally, the inert balls fill the lower part of the adsorber to support the adsorbents. Typically, a screen, often in the form of a basket, surrounding the nozzles can be provided to prevent the inert balls from entering the inlets. Additionally, the inlets and outlets can be used interchangeably depending on the direction of fluid flow and operation of the vessel.

However, this arrangement may have flow distribution problems if the fluid flow is reversed. In many adsorption processes, such as PSA or TSA, the feed flow and regeneration or purge flow are counter-current to each other. Often, it is inevitable to have upward flow for these systems, in addition to downward feed flow. As such, this type of arrangement with a conventional circular tray may give rise to very poor flow distribution. Moreover, without an empty space for the feed gas to circulate and reestablish after high entering jet velocity, the gas tends to flow through the shortest distance or the least resistance path within the inert materials and into the active sorbent layer.

Generally, there exists a need to provide sufficient bed support while improving flow distribution system, especially for a horizontal bed, to alleviate the above problems.

SUMMARY OF THE INVENTION

One exemplary embodiment can be a vessel. The vessel can include a body, an inlet, and an impermeable impingement plate. The body may include a substantially cylindrical structure orientated substantially horizontally, and first and second heads coupled at opposing ends of the substantially cylindrical structure. Generally, the body forms an interior space, and a lower portion of the body forms a trough having a length and a width. The inlet can communicate with the interior space of the vessel. Typically, the impermeable impingement plate has an impingement surface. The impermeable impingement plate may have a first side and a second side extending substantially the length of the trough. The first and second sides may be substantially parallel and spaced apart across at least a portion of the width of the trough.

Another exemplary embodiment may be an adsorption vessel. The adsorption vessel can include a body, an inlet, and an impermeable impingement plate. The body can include a substantially cylindrical structure orientated substantially horizontally, and first and second heads coupled at opposing ends of the substantially cylindrical structure. Typically, the body forms an interior space for containing an adsorbent, and a lower portion of the body forms a trough having a length and a width. Generally, the inlet communicates with the interior space of the vessel. Usually, the impermeable impingement plate has an impingement surface and a width, a first side and a second side corresponding substantially to the length of the trough. The first and second sides may be substantially parallel, and the width of the impermeable impingement plate can substantially correspond to the width of the trough.

A further exemplary embodiment can be a process for adsorbing. The process can include providing an adsorption vessel and impermeable impingement plate. The adsorption vessel can form a trough having a length and width and an interior space, and include at least one inlet. Typically, at least one of a support media and an adsorbent material are positioned within the interior space. The impermeable impingement plate can have an impingement surface positioned substantially horizontally and extending substantially the length of the trough and covering the at least one inlet.

In summary, the embodiments disclosed herein can eliminate a support grid while maintaining good flow distribution characteristics. Moreover, the embodiments disclosed herein can reduce empty voids near the bottom of the vessel, and reduce vessel inert materials and correspondingly thermal duty by omitting a support grid.

Definitions

As used herein, the term "head" can refer to one of a pair of caps on a cylindrically-shaped vessel. Generally, the head can be of a variety of shapes, such as hemispherical, ellipsoidal, torispherical, flat, diffuser, or conical.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

As used herein, the term "impermeable" means a plate impervious to fluid flow.

As used herein, the terms "adsorbent" and "adsorber" include, respectively, an absorbent and an absorber, and relates, but is not limited to, adsorption, and/or absorption.

As used herein, the term "fluid" can mean a gas, a liquid, a suspension that may include one or more solid particles, or a combination thereof. The fluid may include or consist of one or more hydrocarbons.

As used herein, a referenced dimension, such as a length, a width, or a height, can be the maximum such dimension for a structure, such as a body, a trough, or a plate.

BRIEF DESCRIPTION OF THE DRAWINGS

FIG. 1 is a top, plan view of an exemplary impermeable impingement plate.

FIG. 2 is a side-elevational view of the exemplary impermeable impingement plate.

FIG. 3 is a top, plan view of another exemplary impermeable impingement plate.

FIG. 4 is a side-elevational view of the another exemplary impingement plate.

DETAILED DESCRIPTION

Figure 5:
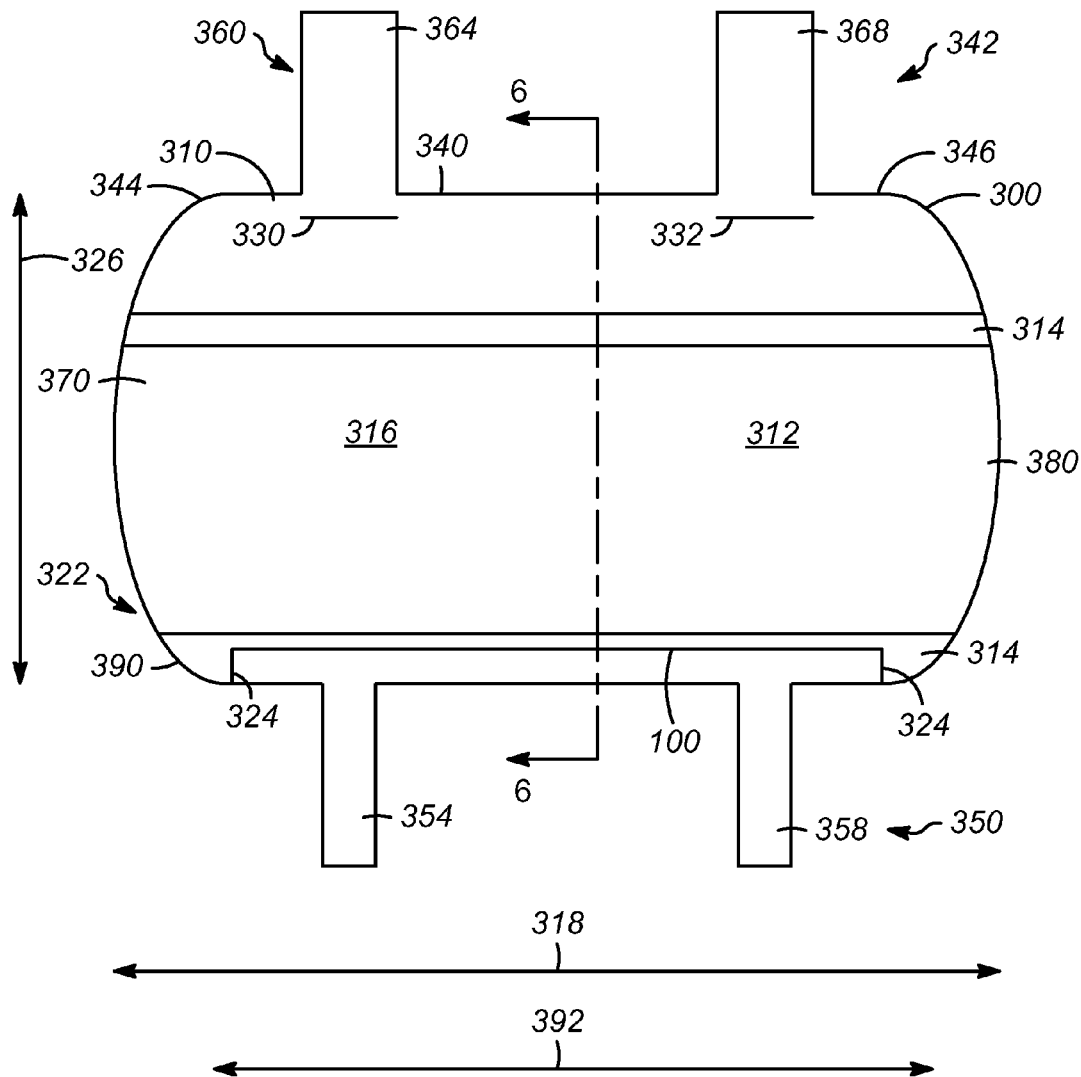
FIG. 5 is a schematic, cross-sectional and elevational view of an exemplary vessel.

Generally, fluid near a vessel wall in a horizontal bed travels a longer distance than the fluid in the middle of the bed. This difference in fluid flow travel may be due to the circular shape of the vessel walls. If incoming fluids enter the packed section of the vessel with a uniform velocity, the fluids generally tend not to exit the vessel at the same time. The different residence times for the fluids traveling in the different sections of the vessel can result in flow distribution problems. Therefore, it is desired to divert the flow toward the walls of a vessel utilizing an impermeable impingement plate.

Referring to FIGS. 1-4, different versions of an impermeable impingement plate 100 are depicted. Referring to FIGS. 1-2, the impermeable impingement plate 100 of this version can include one or more edges 102, be substantially prism-shaped 110 having a first side 120, a second side 124, a first end 130, and a second end 134, and have a substantially uniform length 104 and width 106. Generally, the first side 120 is substantially parallel and spaced apart from the second side 124. Similarly, the first end 130 is substantially parallel and spaced apart from the second end 134. Typically, the impermeable impingement plate 100 is solid and impermeable to fluid flow and has an impingement surface 108. As a consequence, fluid contacting the impermeable impingement plate 100 typically flows around the one or more edges 102.

Referring to FIGS. 3-4, another version of the impermeable impingement plate 100 can include a length 104 and a width 106, optionally substantially uniform, along with the impingement surface 108. In this exemplary version, at opposing ends, a first arch 142 and a second arch 144 may couple the sides 120 and 124. Generally, the arches 142 and 144 can extend into the heads of a vessel, as hereinafter described.

Figure 6:
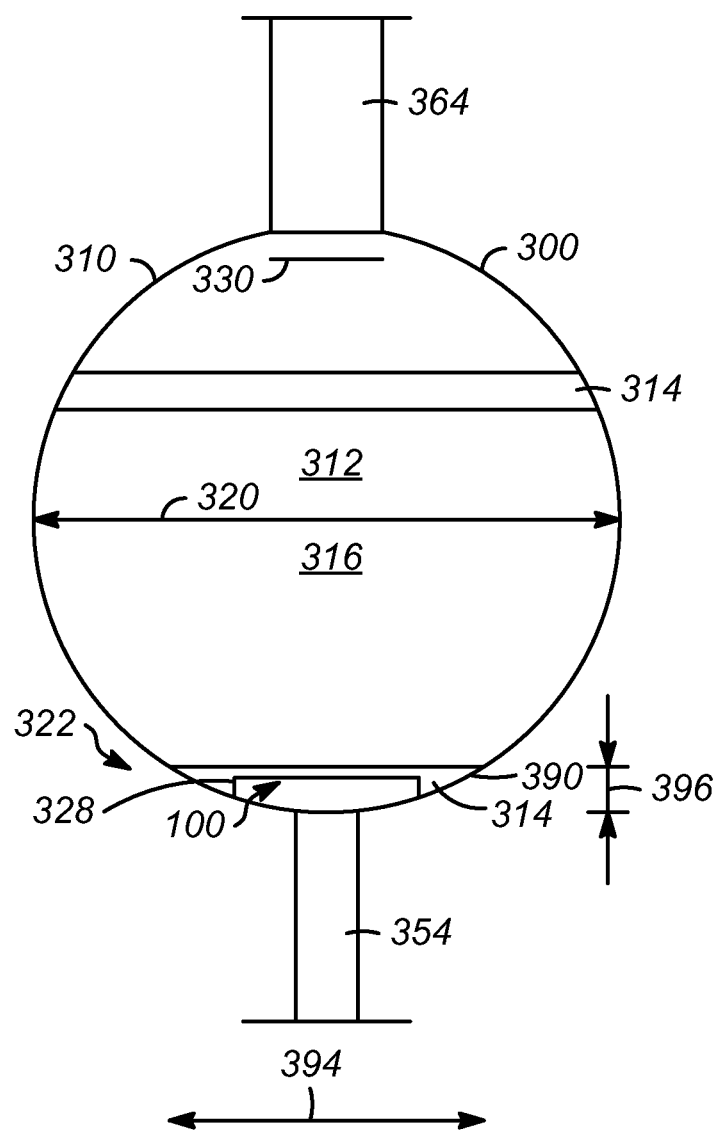
FIG. 6 is an elevational cross-sectional view along line 6-6 of FIG. 5 of the exemplary vessel.
Figure 7:
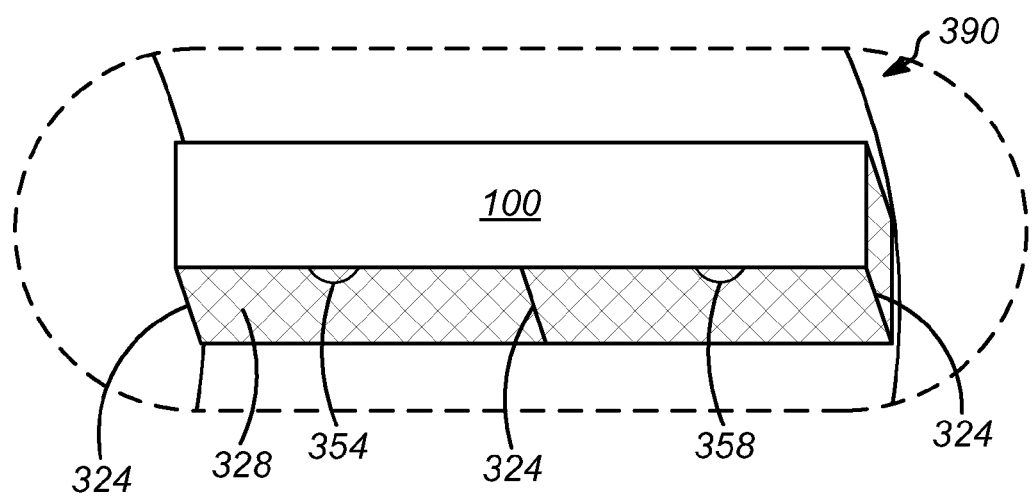
FIG. 7 is a perspective, cutaway view of the impermeable impingement plate residing inside the trough of the vessel.

Referring to FIGS. 5-7, the vessel 300 can include a body or shell 310 forming a substantially cylindrical structure 340 with a first head 370 at one end 344 and a second head 380 at an opposing end 346. The substantially cylindrical structure 340 can be orientated substantially horizontal 342. Generally, the body 310 can contain an interior space 312 that may be filled with a support media 314 and an active material 316, which can be an adsorbent or a catalyst. In addition, the impermeable impingement plate 100 can be positioned within the interior space 312. Although the vessel 300 can be used as an adsorber, it can also be used for other processes, such as a reactor. Particularly, the vessel 300 can be used in any suitable application, including as an air separator, a filter, an exchanger, a catalyst bed, or a regenerator.

The vessel 300 can include at least one or a plurality of inlets 350 for receiving a fluid and at least one outlet or plurality of outlets 360 for an exiting fluid. Generally, the at least one inlet 350 and at least one outlet 360 can be pipes or other structures for conveying fluids to and from the vessel 300. Typically, the fluid includes or is a gas. The at least one inlet 350 can include a first inlet 354 and a second inlet 358, and the at least one outlet 360 can include a first outlet 364 and a second outlet 368. Usually, the at least one inlet 350 is positioned at a bottom of the vessel 300 and opposes the at least one outlet 360 that can be positioned at the top of the body 310. Although the inlets 350 and outlets 360 have been characterized as such, it should be understood that in other operations, such as a regeneration operation, the inlets 350 and outlets 360 can be switched for reversing fluid flow. In addition, the vessel 300 can also include first and second impingement plates 330 and 332. Generally, these first and second impingement plates 330 and 332 can be circular to correspond, respectively, to the diameter of the first outlet 364 and the second outlet 368.

Usually, the impermeable impingement plate 100 can be positioned within a trough 390 or at the top of the trough 390, and be coupled to the body 310 utilizing one or more supports 324 coupled, using any suitable means such as welding, to the bottom of the body 310. Typically, the trough 390 is within a lower portion 322 of the vessel 300. In this exemplary embodiment, the upper limit of the trough 390 can be defined by the boundary between the support media 314 and the active material 316. Preferably, one or more screens 328 can provide a barrier to prevent the support media 314 and/or the active material 316 from entering the inlet 354 and/or inlet 358.

Generally, the impermeable impingement plate 100 in the form of a prism does not touch the sides of the shell 310 of the vessel 300. Instead, the impermeable impingement plate 100 resides in the trough 390. Regarding the version of the impermeable impingement plate 100 depicted in FIGS. 3-4, the arches 142 and 144 can extend at least partially into the respective heads 370 and 380 of the vessel 300. This can further ensure the appropriate distribution of fluid, typically a gas, through the vessel 300.

The support media 314 can be positioned above and below the active material 316 and fill the trough 390 around the screens 328 and the impermeable impingement plate 100. The impermeable impingement plate 100 may be submerged in some of the support media 314, which can be positioned below the active material 316. In addition, other support media 314 can be positioned on top of the active material 316, so the support media 314 may sandwich the active material 316. Generally, the active material 316 fills the interior space 312 within the body 310. Furthermore, in some exemplary embodiments, the support media 314 is not placed on top of the impermeable impingement plate 100. Rather, the support media 314 can be positioned on either side of the impermeable impingement plate 100 positioned within the trough 390. Typically, the support media 314 and the active material 316 may be positioned to form a horizontal bed.

Moreover, the support media 314 can be provided in graded layers, and include inactive tabular alumina balls and/or alumina beads. The active material 316 can include any suitable adsorbent, and can include molecular sieves, such as alumina or zeolite, and/or catalyst. Exemplary support media 314 and active material 316 are disclosed in, e.g., U.S. Pat. No. 7,393,394 B2.

The body 310 of the vessel 300 can include, optionally substantially uniform, a length 318, a width 320, and a height 326. Generally, the width 320 corresponds to the diameter of the substantially cylindrical structure 340. Usually, the body 310 forms the trough 390 for containing the impermeable impingement plate 100. Generally, the trough 390 has, optionally substantially uniform, a length 392, a width 394, and a height 396, which are typically a smaller dimension than, respectively, the length 318, the width 320, and the height 326 of the body 310. The height 396 of the trough 390 can terminate at a height of the impermeable impingement plate 100 above the bottom of the body 310 of the vessel 300.

Generally, the impermeable impingement plate 100 can extend at least about 50%, at least about 70%, and optimally at least about 90% of the length 392 of the trough 390, and preferably extend about 50%, about 70%, and optimally about 90%, of the width 394 of the trough 390. The width 106 and the height of the impermeable impingement plate 100 may be chosen to have sufficient flow area as to not generate excessive pressure drop. In some exemplary embodiments, the impermeable impingement plate 100 covers the entire length 318 of the body 310. In other exemplary embodiments, the impermeable impingement plate 100 does not touch the body 310. Moreover, the width or chord 394 of the trough 390 is greater than the width 106 of the impermeable impingement plate 100. Generally, the impermeable impingement plate 100 covers at least one inlet 350. Preferably, the impermeable impingement plate 100 covers all of the inlets 350. In addition, the first and second impingement plates 330 and 332 may be replaced with either the first or second version of the impermeable impingement plate 100 as depicted in FIGS. 1-4.

With the disclosed embodiments, when the fluid enters the vessel 300 from the inlets 354 and/or 358, the fluid generally flows through the screen 328 and around the impermeable impingement plate 100. Preferably, the fluid flows along the one or more edges 102 of the impermeable impingement plate 100, resulting in higher flows near the shell 310, which typically is a desirable flow pattern for a horizontal bed. Afterwards, the fluid can pass through the support media 314 and active material 316, and exit via the first outlet 364 and the second outlet 368.

Generally, the embodiments disclosed herein can provide a vessel with a fluid, e.g., gas, flow distribution as characterized by a residence time distribution comparable to a bed with a support grid, yet superior to a conventional bed without a support grid, and filled with inert balls supporting an absorbent. Thus, the embodiments disclosed herein can provide a comparable residence time distribution to a vessel without a support grid, allowing a reduction of heat duty by eliminating inert materials in the vessel and reduce the complexity and costs associated with fabricating the vessel.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A vessel, comprising:
A) a body comprising a substantially cylindrical structure orientated substantially horizontally, and first and second heads coupled at opposing ends of the substantially cylindrical structure wherein the body forms an interior space, and a lower portion of the body forms a trough having a length and a width;
B) an inlet communicating with the interior space of the vessel; and
C) an impermeable impingement plate having an impingement surface and having a first side and a second side extending substantially the length of the trough wherein the first and second sides are substantially parallel and spaced apart across at least a portion of the width of the trough.

2. The vessel according to claim 1, wherein the body further comprises one or more supports coupling the impermeable impingement plate to the trough.

3. The vessel according to claim 1, wherein the vessel is further adapted to contain a support media and an active material within the interior space.

4. The vessel according to claim 3, wherein the body further comprises a screen coupled to one or more edges of the impermeable impingement plate and extending substantially downward and coupled to the trough effectively for forming a barrier preventing the support media and/or the active material from interfering with the inlet.

5. The vessel according to claim 1, further comprising an outlet communicating with the interior space of the vessel and positioned on an opposing side of the body from the inlet.

6. The vessel according to claim 5, further comprising a plurality of outlets.

7. The vessel according to claim 1, wherein the impermeable impingement plate has first and second opposing ends wherein each end forms an arch.

8. The vessel according to claim 7, wherein each end of the impermeable impingement plate extends at least partially into respective heads of the body.

9. The vessel according to claim 1, wherein the impermeable impingement plate is a substantially prism-shaped plate.

10. The vessel according to claim 1, wherein a width of the impermeable impingement plate substantially extends to the width of the trough.

11. The vessel according to claim 1, wherein the impermeable impingement plate has a substantially uniform length and width and covers the inlet, and the trough has a substantially uniform length and width.

12. The vessel according to claim 1, further comprising a plurality of inlets.

13. An adsorption vessel, comprising:
A) a body comprising a substantially cylindrical structure orientated substantially horizontally, and first and second heads coupled at opposing ends of the substantially cylindrical structure wherein the body forms an interior space for containing an adsorbent, and a lower portion of the body forms a trough having a length and a width;
B) an inlet communicating with the interior space of the vessel; and
C) an impermeable impingement plate having an impingement surface and a width, a first side and a second side corresponding substantially to the length of the trough wherein the first and second sides are substantially parallel, and the width of the impermeable impingement plate substantially corresponds to the width of the trough.

14. The adsorption vessel according to claim 13, wherein the length of the impermeable impingement plate extends at least about 50% of the length of the trough and covers the inlet.

15. The adsorption vessel according to claim 13, wherein the length of the impermeable impingement plate extends at least about 70% of the length of the trough and covers the inlet.

16. The adsorption vessel according to claim 13, wherein the length of the impermeable impingement plate extends at least about 90% of the length of the trough and covers the inlet.

17. The adsorption vessel according to claim 13, wherein the width of the impermeable impingement plate extends at least about 50% of the width of the trough and covers the inlet.

18. The adsorption vessel according to claim 13, wherein the width of the impermeable impingement plate extends at least about 70% of the width of the trough and covers the inlet.

19. The adsorption vessel according to claim 13, wherein the width of the impermeable impingement plate extends at least about 90% of the width of the trough and covers the inlet.

* * * * *